(12) United States Patent
Shi

(10) Patent No.: US 11,678,300 B2
(45) Date of Patent: Jun. 13, 2023

(54) COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/409,694

(22) Filed: Aug. 23, 2021

(65) Prior Publication Data

US 2021/0385796 A1    Dec. 9, 2021

Related U.S. Application Data

(63) Continuation of application No. PCT/CN2019/098858, filed on Aug. 1, 2019.

(51) Int. Cl.
*H04W 72/02* (2009.01)
*H04W 72/23* (2023.01)
*H04W 72/566* (2023.01)

(52) U.S. Cl.
CPC .......... *H04W 72/02* (2013.01); *H04W 72/23* (2023.01); *H04W 72/569* (2023.01)

(58) Field of Classification Search
CPC ... H04L 1/1887; H04L 5/0062; H04L 5/0064; H04L 1/189; H04L 1/08; H04L 5/0044; H04L 5/0053
USPC ................................. 370/328, 329, 330, 331
See application file for complete search history.

(56) References Cited

U.S. PATENT DOCUMENTS

| | | | | |
|---|---|---|---|---|
| 9,807,800 | B2* | 10/2017 | Sun | .................... H04W 72/0413 |
| 10,149,326 | B2* | 12/2018 | Sun | .................... H04W 74/0833 |
| 10,694,399 | B1* | 6/2020 | Tran | .......................... H01Q 3/01 |
| 2015/0282213 | A1* | 10/2015 | Sun | .................... H04W 72/0413 |
| | | | | 370/329 |
| 2018/0242367 | A1* | 8/2018 | Kim | ...................... H04L 5/0053 |

(Continued)

FOREIGN PATENT DOCUMENTS

| | | |
|---|---|---|
| CN | 108702768 A | 10/2018 |
| WO | 2018201992 A1 | 11/2018 |

OTHER PUBLICATIONS

3GPP RAN WG2 Meeting #106—R2-1906407—Reno, USA, May 13-17, 2019—Revision of R2-1903555—InterDigital, Resource Conflicts for Data-only Intra-UE Prioritization (4 pages).

(Continued)

*Primary Examiner* — David Q Nguyen
(74) *Attorney, Agent, or Firm* — Perkins Coie LLP

(57) ABSTRACT

Implementations of the present disclosure relate to a communication method, a terminal device, and a network device. The method comprises: if a physical uplink control channel (PUCCH) resource for a terminal device to transmit a first scheduling request (SR) overlaps with a physical uplink shared channel (PUSCH) resource for the terminal device to transmit a first media access control (MAC) protocol data unit (PDU), the terminal device determines whether to preferentially transmit the first SR to a network device. The communication method, terminal device, and network device of the implementations of the present disclosure can improve the possibility of normal IIOT service transmission.

4 Claims, 4 Drawing Sheets

(56) References Cited

U.S. PATENT DOCUMENTS

| | | | |
|---|---|---|---|
| 2019/0230683 A1 | 7/2019 | Akkarakaran et al. | |
| 2020/0022161 A1* | 1/2020 | Yang | H04L 5/0053 |
| 2020/0068599 A1* | 2/2020 | Yang | H04L 5/0057 |
| 2020/0367265 A1* | 11/2020 | Wang | H04L 5/0051 |
| 2020/0413428 A1* | 12/2020 | Liu | H04W 80/08 |
| 2021/0029724 A1* | 1/2021 | Tsai | H04W 72/046 |
| 2022/0095335 A1* | 3/2022 | Gao | H04L 1/1887 |

OTHER PUBLICATIONS

3GPP RAN WG2 Meeting #106—R2-1906409—Reno, USA, May 13-17, 2019—Resubmission of R2-1904546—InterDigital, Intra UE prioritization between SR and PUSCH (3 pages).

3GPP TS 38.321 V16.2.1 (Sep. 2020)—3rd Generation Partnership Project; Technical Specification Group Radio Access Network; NR; Medium Access Control (MAC) protocol specification (154 pages). (Release 16).

3GPP TSG-RAN WG2 #106—R2-1906046—Reno, US, May 13-17 2019—Revision of R2-1903808—OPPO, Intra-UE prioritization between SR and PUSCH (3 pages).

3GPP TSG-RAN WG2 Meeting #106—R2-1906189—Reno, NV, USA, May 13-17, 2019—Nokia, Nokia Shanghai Bell, MAC Behaviour for Resource Collision between SR-PUCCH and PUSCH (2 pages).

International Search Report dated Apr. 22, 2020 of PCT/CN2019/098858 (2 pages).

Ericsson "Control-data prioritization—SR over PUSCH" Tdoc R2-1906851; 3GPP TSG-RAN WG2 #106; Reno, US; May 13-17, 2019. 6 pages.

Examination Report for Indian Application No. 202117038814 dated Mar. 4, 2022. 6 pages with English translation.

Extended European Search Report for European Application No. 19939116.0 dated Feb. 16, 2022. 9 pages.

Nokia et al. "Handling of De-prioritized Uplink Transmission" R2-1906188; 3GPP TSG-RAN WG2 Meeting #106; Reno, NV; May 13-17, 2019. 2 pages.

China First Office Action dated Sep. 16, 2022 in Application No. 202111118134.X, 16 Pages.

Examination Report for European Application No. 19939116.0 dated Dec. 5, 2022. 6 pages.

\* cited by examiner

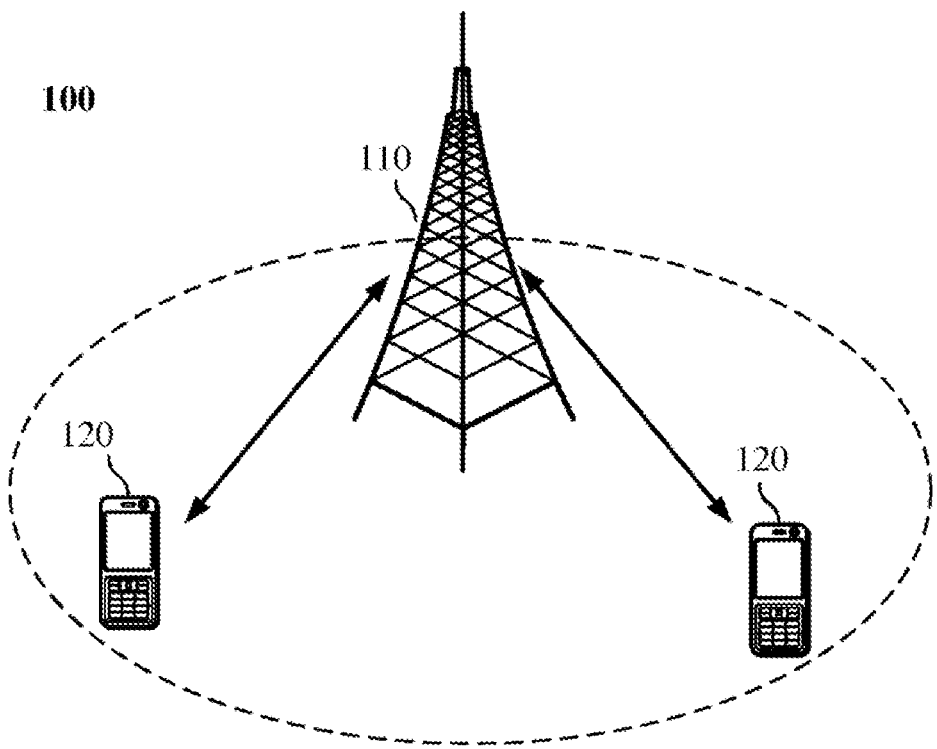
FIG. 1
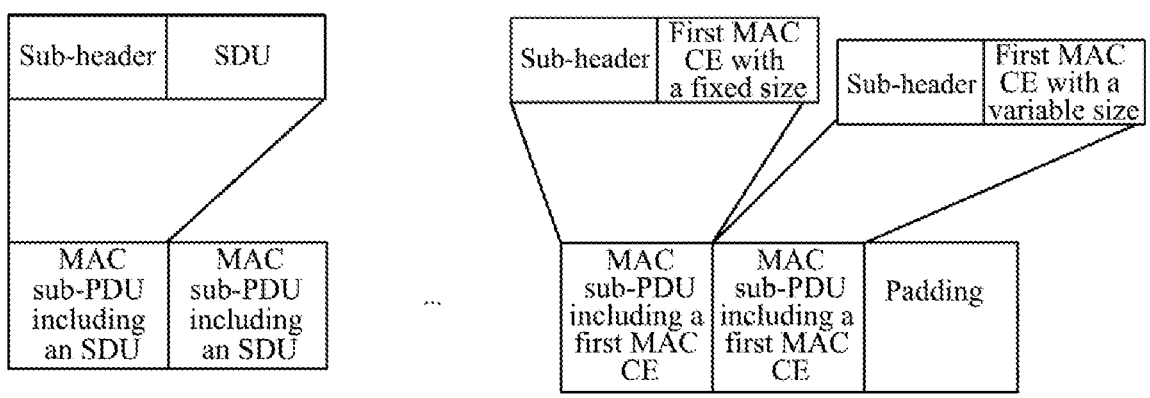
FIG. 2
FIG. 3

300

When a Physical Uplink Control Channel (PUCCH) resource for a terminal device to transmit a first Scheduling Request (SR) and a Physical Uplink Shared Channel (PUSCH) resource to transmit a first Media Access Control (MAC) Protocol Data Unit (PDU) are overlapped, and the terminal device determines to preferentially transmit the first SR, if the first MAC PDU is not packaged, the terminal device determines whether to package the first MAC PDU — 310

If a Physical Uplink Control Channel (PUCCH) resource for a terminal device to transmit a first Scheduling Request (SR) and a Physical Uplink Shared Channel (PUSCH) resource to transmit a first Media Access Control (MAC) Protocol Data Unit (PDU) are overlapped, a network device preferentially receives the first SR — 410

FIG. 8

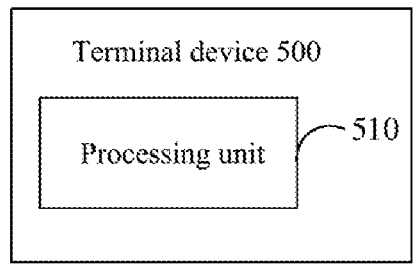

FIG. 9

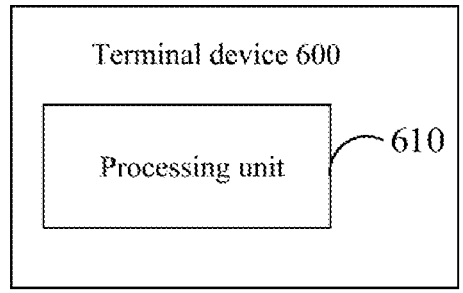

FIG. 10

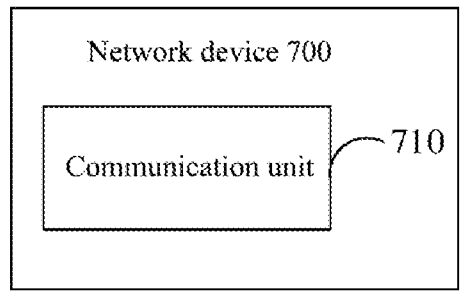

FIG. 11

COMMUNICATION METHOD, TERMINAL DEVICE, AND NETWORK DEVICE

CROSS-REFERENCE TO RELATED APPLICATION

The present application is a continuation application of International PCT Application No. PCT/CN2019/098858, filed on Aug. 1, 2019, the entire content of which is hereby incorporated by reference.

TECHNICAL FIELD

The present disclosure relates to the field of communications, specifically to a communication method, a terminal device and a network device.

BACKGROUND

A 5G system introduces a concept of Industrial Interest of Things (IIoT), which may support a transmission of a service such as Factory Automation, Transport Industry, or Electrical Power Distribution, in the 5G system.

Therefore, how to ensure a normal transmission of an IIOT service is an urgent problem to be solved.

SUMMARY

Implementations of the present disclosure provide a communication method, a terminal device, and a network device, which may improve possibility of a normal transmission of an IIOT service.

In a first aspect, a communication method is provided, including: if a Physical Uplink Control Channel (PUCCH) resource for a terminal device to transmit a first Scheduling Request (SR) and a Physical Uplink Shared Channel (PUSCH) resource to transmit a first Media Access Control (MAC) Protocol Data Unit (PDU) are overlapped, determining, by the terminal device, whether to preferentially transmit the first SR to a network device.

In a second aspect, a communication method is provided, including: when a Physical Uplink Control Channel (PUCCH) resource for a terminal device to transmit a first Scheduling Request (SR) and a Physical Uplink Shared Channel (PUSCH) resource to transmit a first Media Access Control (MAC) Protocol Data Unit (PDU) are overlapped, and the terminal device determines to preferentially transmit the first SR, if the first MAC PDU is not packaged, determining, by the terminal device, whether to package the first MAC PDU.

In a third aspect, a communication method is provided, including: if a Physical Uplink Control Channel (PUCCH) resource for a terminal device to transmit a first Scheduling Request (SR) and a Physical Uplink Shared Channel (PUSCH) resource to transmit a first Media Access Control (MAC) Protocol Data Unit (PDU) are overlapped, preferentially receiving, by a network device, the first SR transmitted by the terminal device.

In a fourth aspect, a terminal device is provided, configured to perform the method in any one of the above first to second aspects or various implementation modes thereof.

Specifically, the terminal device includes functional modules configured to perform the method in any one of the above first to second aspects or in various implementation modes thereof.

In a fifth aspect, a network device is provided, configured to perform the method in the above third aspect or each implementation thereof.

Specifically, the network device includes function modules used for performing the method in the third aspect described above or various implementation modes thereof.

In a sixth aspect, a terminal device is provided. The terminal device includes a processor and a memory. The memory is configured to store a computer program, and the processor is configured to call and run the computer program stored in the memory to execute the method in any one of the above first aspect to second aspects or various implementation modes thereof.

In a seventh aspect, a network device is provided. The network device includes a processor and a memory. The memory is configured to store a computer program, and the processor is configured to call and run the computer program stored in the memory to execute the method according to the third aspect described above or various implementation modes of the third aspect.

In an eighth aspect, an apparatus is provided, configured to implement the method in any one of the above first to third aspects or various implementation modes thereof.

Specifically, the apparatus includes a processor, configured to call and run a computer program from a memory, so that a device in which the apparatus is installed performs the method as any one of the above first to third aspects or each implementation thereof.

Optionally, the apparatus is a chip.

In a ninth aspect, a computer readable storage medium is provided, configured to store a computer program, wherein the computer program enables a computer to perform the method in any one of the above first to third aspects or various implementation modes thereof.

In a tenth aspect, a computer program product is provided, including computer program instructions, wherein the computer program instructions enable a computer to perform the method in any one of the above first to third aspects or various implementation modes thereof.

In an eleventh aspect, a computer program is provided, wherein when the computer program is run on a computer, the computer is enabled to perform the method in any one of the above first to third aspects or various implementation modes thereof.

According to the above technical solution, when a resource for transmitting an SR and a resource for transmitting an MAC PDU are overlapped, a terminal device may determine whether to preferentially transmit the SR. In this way, the terminal device may preferentially transmit the SR in some scenarios, which may ensure to a certain extent that a network device knows that there is an IIOT service which needs to be transmitted in time, so that the network device may schedule the IIOT service in time, thus ensuring QoS of the IIOT service and improving possibility of a normal transmission of the IIOT service.

BRIEF DESCRIPTION OF DRAWINGS

FIG. 1 is a schematic diagram of an architecture of a communication system in accordance with an implementation of the present disclosure.

FIG. 2 is a schematic diagram of a communication method according to an implementation of the present disclosure.

FIG. 3 is a schematic structure diagram of an MAC PDU according to an implementation of the present disclosure.

FIG. 7 is a schematic diagram of another communication method according to an implementation of the present disclosure.

FIG. 8 is a schematic diagram of another communication method according to an implementation of the present disclosure.

FIG. 9 is a schematic block diagram of a terminal device in accordance with an implementation of the present disclosure.

FIG. 10 is a schematic block diagram of a terminal device in accordance with an implementation of the present disclosure.

FIG. 11 is a schematic block diagram of a network device according to an implementation of the present disclosure.

DETAILED DESCRIPTION

Figure 4:
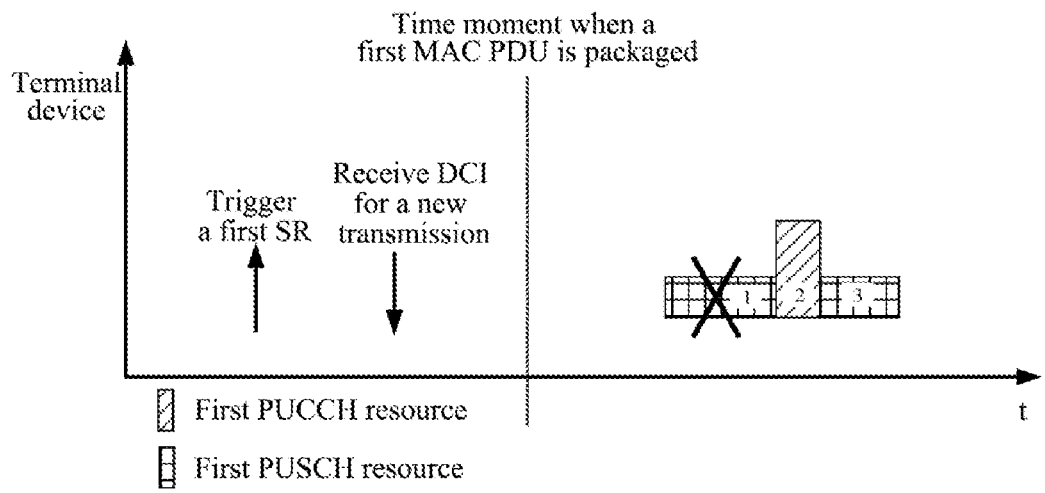
FIG. 4 is a schematic diagram of preferentially transmitting, by a terminal device, a first SR according to an implementation of the present disclosure.

Technical solutions in implementations of the present disclosure will be described below with reference to the drawings in the implementations of the present disclosure. It is apparent that the implementations described are just some of the implementations of the present disclosure, but not all of the implementations of the present disclosure. Based on the implementations of the present disclosure, all other implementations achieved by a person of ordinary skill in the art without making inventive efforts are within the protection scope of the present disclosure.

The implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a next generation communication system or other communication systems.

Generally speaking, traditional communication systems support a limited quantity of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, and the implementations of the present disclosure may also be applied to these communication systems.

Optionally, a communication system in the implementations of the present disclosure may be applied to a carrier aggregation (CA) scenario, a dual connectivity (DC) scenario, or a standalone (SA) scenario.

Illustratively, a communication system 100 applied in an implementation of the present disclosure is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a base transceiver station (BTS) in a GSM system or CDMA system, a NodeB (NB) in a WCDMA system, an Evolutional Node B (eNB or eNodeB) in an LTE system, or a radio controller in a cloud radio access network (CRAN), or the network device may be a network side device in a mobile switching center, a relay station, an access point, a vehicle-mounted device, a wearable device, a hub, a switch, a bridge, a router, or a network side device in a 5G network, or a network device in a future evolved public land mobile network (PLMN), etc.

The wireless communication system 100 further includes at least one terminal 120 located within a coverage range of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular phone; a personal communication system (PCS) terminal capable of being combined with a cellular radio phone with data processing, faxing, and data communication abilities; a personal digital assistant (PDA) that may include a radio telephone, a pager, internet/intranet access, a Web browser, a memo pad, a calendar, and/or a Global Positioning System (GPS) receiver; and a conventional laptop and/or palmtop receiver or other electronic apparatus including a radio phone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

The network device 110 may provide a service for a cell, and the terminal device 120 communicates with the network device 110 through a transmission resource (e.g., a frequency domain resource, or say, a spectrum resource) used by the cell. The cell may be a cell corresponding to the network device 110 (e.g., a base station). A cell may belong to a macro base station, or a base station corresponding to a Small cell. The Small cell here may include, for example, a Metro cell, a Micro cell, a Pico cell, a Femto cell, etc. These Small cells have characteristics of a small coverage range and a low transmission power, and are suitable for providing a high-speed data transmission service.

FIG. 1 illustrates one network device and two terminal devices. Optionally, the communication system 100 may include multiple network devices, and other numbers of terminal devices may be included within the coverage range of each network device, which is not limited in the implementations of the present disclosure.

Optionally, the communication system 100 may include other network entities, such as a network controller and a mobile management entity, which is not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, and will not be described repeatedly herein. The communication device may also include other devices in the communication system 100, such as network controllers and mobile management entities and other network entities, which is not limited in the implementations of the present disclosure.

It should be understood that the terms "system" and "network" are often used interchangeably herein.

In a communication process between a terminal device and a network device, a Scheduling Request (SR) is used for requesting an uplink resource. The network device may configure 0, 1, or more SR configurations for a Media Access Control (MAC) layer of the terminal device. One SR may correspond to a group of Physical Uplink Control Channel (PUCCH) resources, and one SR configuration may correspond to one or more logical channels. When a certain condition is satisfied, a Buffer State Report (BSR) may trigger a corresponding SR.

On a terminal device side, there may be a problem of a resource conflict (which may also be called resource overlapping), for example, there is a conflict between a PUCCH resource for transmitting an SR and a Physical Uplink Shared Channel (PUSCH) resource for transmitting a Media Access Control (MAC) Protocol Data Unit (PDU). According to an existing protocol, when there is a conflict between a PUCCH resource for transmitting an SR and a PUSCH resource for transmitting an MAC PDU, a terminal device will not transmit the SR. In this case, for an HOT service, it may be caused that the network device does not know that an HOT service needs to be transmitted currently, so that the network device may delay scheduling of the HOT service, thereby producing problems of transmission delay of the HOT service and that a Quality of Service (QoS) of the HOT service cannot be guaranteed, which cannot be tolerated in HOT.

In view of this, an implementation of the present disclosure proposes a communication method, which may improve possibility of a normal transmission of an HOT service. It should be understood that the SR in an implementation of the present disclosure may be a scheduling request of the HOT service, or a scheduling request of another service.

FIG. 2 is a schematic diagram of a communication method 200 according to an implementation of the present disclosure. The method shown in FIG. 2 may be performed by a terminal device. The terminal device may be, for example, the terminal device 120 shown in FIG. 1. As shown in FIG. 2, the method 200 may include at least part of following contents.

It should be understood that the method 200 may be applied to multiple communication scenarios. For example, the method 200 may be applied to following scenarios: a data channel and a data channel are overlapped, a data channel and a control channel are overlapped, and a control channel and a control channel are overlapped. Herein, the control channel may also be understood as Uplink Control Information (UCI), and the UCI may be at least one of following: Hybrid Automatic Repeat Request (HARQ) feedback, a Channel-State Information Reference Signal (CSI-RI), or an SR.

In 210, if a PUCCH resource for a terminal device to transmit a first SR and a PUSCH resource to transmit a first MAC PDU are overlapped, the terminal device determines whether to preferentially transmit the first SR to a network device.

Herein, the first SR may be an SR corresponding to a first logical channel, and/or the first SR may be an SR triggered by a first service. The first service may correspond to the first logical channel, that is, the first service is carried on the first logical channel.

Optionally, the first service may be a service with a strict QoS requirement, for example, a URLLC service, an IIoT service, a Time Sensitive Network (TSN) service. Of course, the first service may also be an Enhanced Mobile Broadband (eMBB) service, a vertical industry service, a Voice over Long-Term Evolution (VoLTE) service, or a vehicle networking service, etc.

The term "and/or" in the document is merely an association relationship describing associated objects, indicating that there may be three relationships, for example, A and/or B may indicate three situations: A alone, A and B, and B alone.

It should also be understood that the terminal device transmits the first SR and transmits the first MAC PDU in the above content, which may also be expressed as: the terminal device sends the first SR and sends the first MAC PDU.

In an implementation of the present disclosure, according to a timing priority, there are four scenarios where a PUCCH resource and a PUSCH resource are overlapped (for convenience of description, the PUCCH resource is called a first PUCCH resource, and the PUSCH resource is called a first PUSCH resource), specifically as follows.

(1) A priority of the first SR is low, and the first MAC PDU has not been packaged when the first SR is triggered. At this time, for an MAC layer of the terminal device, since the priority of the first SR is low, then the first MAC PDU is packaged and the MAC layer preferentially transmits the first MAC PDU to a physical layer without transmitting the first SR.

(2) The priority of the first SR is low, and the first MAC PDU has been packaged when the first SR is triggered. At this time, the MAC layer of the terminal device does not indicate the physical layer to transmit the first SR.

(3) The priority of the first SR is high, and the first MAC PDU has been packaged when the first SR is triggered. At this time, for the MAC layer of the terminal device, since the priority of the first SR is high, then the first MAC PDU is a deprioritized MAC PDU.

(4) The priority of the first SR is high, and the first MAC PDU has not been packaged when the first SR is triggered.

The first PUCCH resource and the first PUSCH resource are overlapped, which may be understood as: the first PUCCH resource and the first PUSCH resource have an overlapped part in time domain. Or, the first PUCCH resource and the first PUSCH resource have an overlapped part in frequency domain. Or, the first PUCCH resource and the first PUSCH resource have an overlapped part in time-frequency domain (i.e., a part overlapped in both the time domain and the frequency domain).

The first PUCCH resource and the first PUSCH resource are overlapped, which may also be understood as: the first PUCCH resource and the first PUSCH resource are overlapped completely or partially.

Optionally, the terminal device determines whether to preferentially transmit the first SR, which may be understood as at least one of following: when the first PUCCH resource and the first PUSCH resource are overlapped, the terminal device determines whether to preferentially transmit the first SR; the terminal device determines whether to preferentially transmit the first SR in the overlapped part of the first PUCCH resource and the first PUSCH resource; or the terminal device determines whether to preferentially transmit the first SR in a non-overlapped part of the first PUCCH resource and the first PUSCH resource.

Optionally, the terminal device determines whether to preferentially transmit the first SR, which may refer to at least one of following cases: the terminal device determines whether to indicate, at the MAC layer, the physical layer to preferentially transmit the first SR; the terminal device determines whether to preferentially transmit the first SR to the physical layer at the MAC layer; or the terminal device determines whether to preferentially transmit the first SR to the network device at the physical layer.

It should be understood that the name of the first PUSCH resource is not limited in the implementations of the present disclosure, that is, it may also be expressed as another name. For example, the first PUSCH resource may also be expressed as an Uplink-Shared Channel (UL-SCH) resource. Each grant may correspond to one resource. In an implementation of the present disclosure, a grant may also be understood as a resource. Therefore, the first PUSCH resource may also be expressed as a grant or an uplink grant (UL grant).

Herein, the grant may be assigned by the network device, or preconfigured. When the network device allocates a grant to the terminal device, the grant allocated by the network device to the terminal device may include a Configured Grant and/or a dynamic grant. Herein, the Configured Grant may be semi-statically configured by the network device to the terminal device, and the dynamic grant may be dynamically scheduled by the network device to the terminal device, for example, it may be scheduled to the terminal device through Downlink Control Information (DCI).

Technical solutions of the implementations of the present disclosure are described in the following in details with reference to specific implementation modes.

Act 1: the network device configures SR configuration information and logical channel configuration information to the terminal device. Herein, the network device may configure a configuration ID of the first SR or an ID of the first PUCCH resource in the logical channel configuration information, and the terminal device may acquire the first PUCCH resource in the SR configuration information through the configuration ID of the first SR or the ID of the first PUCCH resource.

Act 2: the network device configures a semi-static scheduling configured grant or a dynamic grant. If the semi-static scheduling configured grant is configured, the network device may indicate the configured grant to the terminal device through a Radio Resource Control (RRC) signaling. If the dynamic grant is configured by the network device, the network device may indicate the dynamic grant to the terminal device through the DCI.

Act 3: the terminal device receives the configured Configured Grant or the dynamic grant, determines that there is an uplink resource for transmitting uplink data, and determines that there is an available PUSCH.

Act 4: when the configured first logical channel satisfies a condition of triggering the first SR, the terminal device triggers the first SR at the MAC layer.

Specifically, when data of the first logical channel need to be sent, the BSR may be triggered. In a case that the terminal device does not have an available uplink resource to send the BSR, the terminal device may request the network device to configure an uplink resource for sending the data of the first logical channel by sending the first SR, wherein the first SR may be transmitted on the first PUCCH resource.

Assuming that the first PUCCH resource and the first PUSCH resource currently are overlapped, the terminal device needs to determine, at the MAC layer, which channel or information is transmitted preferentially.

In an implementation, when the first PUCCH resource and the first PUSCH resource are overlapped, in any case, the terminal device may determine, at the MAC layer, to preferentially transmit the first SR to the physical layer, and/or indicate, at the MAC layer, the physical layer to preferentially transmit the first SR to the network device.

In another implementation, according to first information, the terminal device may determine whether to preferentially transmit the first SR to the physical layer at the MAC layer, and/or indicate, at the MAC layer, the physical layer to preferentially transmit the first SR to the network device.

Optionally, the first information may be predefined, for example, it may be preset on the terminal device according to a protocol specification. Or, the network device may send a first message to the terminal device, wherein the first message includes the first information. Herein, the first message may be carried in an RRC signaling, or in the DCI, or in an MAC CE. Specifically, the network device may send the first message to the terminal device when configuring the SR configuration information and the logical channel configuration information.

The first information will be described in detail below.

In an implementation of the present disclosure, the first information may include but is not limited to at least one of the following:

first indication information for the network device to indicate whether to preferentially transmit the first SR;

second indication information for the terminal device to indicate to the network device at least one of following: whether to have an ability of using a first Logical Channel Prioritization (LCP) order, whether to use the first LCP order, or the first LCP order being to be used;

a type of a first MAC Control Element (CE) included in the first MAC PDU;

an attribute of the first PUCCH resource;

an attribute of the first PUSCH resource;

an attribute of the first logical channel corresponding to the first SR;

an attribute of a logical channel corresponding to the first MAC CE, wherein the logical channel corresponding to the first MAC CE may also be called a logical channel corresponding to the first MAC PDU;

a reason for triggering the first MAC CE;

whether the first PUSCH resource may carry the data of the first logical channel;

a time order of triggering the first SR and packaging the first MAC PDU;

whether the first logical channel satisfies an LCP restriction of the first PUSCH resource; or, a reason for triggering a random access process.

It should be understood that one of the above multiple conditions, any two of them, any three of them, any four of them, or any five of them, or any six of them, or any seven of them, or any eight of them, or any nine of them may be taken as a first condition of an implementation of the present disclosure.

Optionally, the first logical channel corresponding to the first SR may be understood as: the first logical channel is a logical channel transmitted on the first PUCCH resource, that is, a logical channel transmitted on the first PUCCH resource triggering the first SR, or the first logical channel is a logical channel corresponding to data triggering the first SR, that is, the first logical channel may be a logical channel contained in the first SR.

The logical channel corresponding to the first MAC CE may be understood as: the logical channel corresponding to the first MAC CE is a logical channel corresponding to information carried in the first MAC CE, or the logical channel corresponding to the first MAC CE is a logical channel transmitted on the first PUSCH resource, or the logical channel corresponding to the first MAC CE is a logical channel triggering the first MAC CE.

Optionally, when the first indication information indicates whether the terminal device preferentially transmits the first SR, as an example, the first indication information may explicitly indicate whether the terminal device preferentially transmits the first SR.

Illustratively, the first indication information may include 1 bit, and a bit "1" indicates that the terminal device preferentially transmits the first SR, and a bit "0" indicates that the terminal device does not preferentially transmit the first SR. Or, the bit "1" indicates that the terminal device does not preferentially transmit the first SR, and the bit "0" indicates that the terminal device preferentially transmits the first SR. For another example, the first indication information may include multiple bits. If the multiple bits are same, it is indicated that the terminal device preferentially transmits the first SR; and if at least two bits in the multiple bits are different, it is indicated that the terminal device does not preferentially transmit the first SR. For example, if the bits of the first indication information are "111", it is indicated that the terminal device preferentially transmits the first SR, and if the bits of the first indication information are "010", it is indicated that the terminal device does not to preferentially transmit the first SR. For another example, the first indication information may include multiple bits. If the multiple bits are same and all are "1", it is indicated that the terminal device preferentially transmits the first SR; and if the multiple bits are same and all are "0", it is indicated that the terminal device does not to preferentially transmit the first SR.

As another example, the first indication information may implicitly indicate whether the terminal device preferentially transmits the first SR.

Illustratively, the first indication information may indicate priorities of the first PUCCH resource and the first PUSCH resource. For example, the first indication information indicates that the priority of the first PUCCH resource is higher than that of the first PUSCH resource, then the terminal device may determine to preferentially transmit the first SR after receiving the first indication information. whether to have an ability of using a first Logical Channel Prioritization (LCP) order Similar to the first indication information, in an implementation, the second indication information indicates at least one of whether the terminal device has the ability of using the first LCP order, whether to use the first LCP order, or that the terminal device will use the first LCP order, and this implementation may refer to the implementation of the first indication information, and will not be described in details for brevity of the content.

Optionally, the attribute of the first PUCCH resource may include but is not limited to at least one of following: the priority of the first PUCCH resource, an identity of the first PUCCH resource, a period of the first PUCCH resource, a duration of the first PUCCH resource, or a Modulation and Coding Scheme (MCS) level corresponding to the first PUCCH resource.

Herein, the duration of the first PUCCH resource may also be called a duration time of the first PUCCH resource, and the MCS level corresponding to the first PUCCH resource may be understood as: an MCS level used when information is transmitted on the first PUCCH resource.

In addition to the priority of the first PUCCH resource, the priority of the first PUCCH resource may also be understood as: a priority of a certain logical channel among all logical channels carried in the first PUCCH resource. For example, a certain logical channel may be a logical channel with a highest priority, or a logical channel with a lowest priority, or any one logical channel, among all logical channels carried in the first PUCCH resource.

Optionally, the attribute of the first PUSCH resource may include but is not limited to at least one of following: the priority of the first PUSCH resource, an identity of the first PUSCH resource, a period of the first PUSCH resource, a duration of the first PUSCH resource, an MCS level corresponding to the first PUSCH resource, an attribute of a logical channel that the first PUSCH resource can carry, or service information that the first PUSCH resource can carry.

Herein, the duration of the first PUSCH resource may also be called a duration time of the first PUSCH resource, and the MCS level corresponding to the first PUSCH resource may be understood as an MCS level used when information is transmitted on the first PUSCH resource.

In addition to the priority of the first PUSCH resource, the priority of the first PUSCH resource may also be understood as: a priority of a certain logical channel among all logical channels carried in the first PUSCH resource. For example, a certain logical channel may be a logical channel with a highest priority, or a logical channel with a lowest priority, or any logical channel, among all logical channels carried in the first PUSCH resource.

Optionally, an attribute of a logical channel may include but is not limited to at least one of following: a priority of the logical channel, an identity of the logical channel, or service information of a service carried by the logical channel.

Herein, if the logical channel includes multiple logical channels, the priority of the logical channel may be: a priority of a logical channel with a highest priority among the multiple logical channels, a priority of a logical channel with a lowest priority among the multiple logical channels, or a priority of any one of the multiple logical channels.

Optionally, the service information may include but is not limited to at least one of following: a service priority, a service type, a service identity, or a service Quality of Service (QoS).

With regard to the first LCP order, the first LCP order in an implementation of the present disclosure is a supplement and/or an adjustment to an existing LCP order. Herein, the existing LCP order is as follows, wherein priorities are arranged from high to low:

Cell-Radio Network Temporary Identity (C-RNTI) MAC CE or data from UL-Common Control Channel (UL-CCCH);

Configured Grant Confirmation MAC CE;

MAC CE for BSR, with exception of BSR included for padding;

Single Entry Power Headroom Report (PHR) MAC CE or a Multiple Entry PHR MAC CE;

data from any Logical Channel, except data from UL-Common Control Channel (UL-CCCH);

MAC CE for Recommended bit rate query;

MAC CE for BSR included for padding.

Optionally, in an implementation of the present disclosure, in the first LCP order, a priority of data of a logical channel carrying the first service may be higher than that of the Configured Grant Confirmation MAC CE, and/or a priority of a BSR MAC CE of the first service or the first logical channel may be higher than that of the Configured Grant Confirmation MAC CE. Herein, the priority of the data of the logical channel carrying the first service may also be a priority of data of the first logical channel.

Or, in the first LCP order, the priority of the data of the logical channel carrying the first service may be higher than a priority of C-RNTI MAC CE or data from UL-CCCH, and/or the priority of the BSR MAC CE of the first service or the first logical channel is higher than the priority of C-RNTI MAC CE or data from UL-CCCH.

Illustratively, in an implementation of the present disclosure, the first LCP order may be any one order of (a), (b), (c), or (d). In following four possible first LCP orders, a priority of information in each first LCP order is arranged from high to low.

(a):
data from any logical channel associated to URLLC;
C-RNTI MAC CE or data from UL-CCCH;
Configured Grant Confirmation MAC CE;
MAC CE for BSR, with exception of BSR included for padding;
Single Entry Power Headroom Report;
data from any logical channel, except data from UL-CCCH and URLLC;
MAC CE for Recommended bit rate query;
MAC CE for BSR included for padding.
(b):
MAC CE for BSR for URLLC;
data from any logical channel associated to URLLC;
C-RNTI MAC CE or data from UL-CCCH;
Configured Grant Confirmation MAC CE;
MAC CE for BSR, with exception of BSR included for padding and BSR for URLLC;
Single Entry PHR MAC CE or Multiple Entry PHR MAC CE;
data from any logical channel, except data from UL-CCCH and URLLC;
MAC CE for Recommended bit rate query;
MAC CE for BSR included for padding.
(c):
C-RNTI MAC CE or data from UL-CCCH;
data from any logical channel associated to URLLC;
Configured Grant Confirmation MAC CE;
MAC CE for BSR, with exception of BSR included for padding;
Single Entry PHR MAC CE or Multiple Entry PHR MAC CE;
data from any logical channel, except data from UL-CCCH and URLLC;
MAC CE for Recommended bit rate query;
MAC CE for BSR included for padding.
(d):
C-RNTI MAC CE or data from UL-CCCH;
MAC CE for BSR for URLLC;
data from any logical channel associated to URLLC;
Configured Grant Confirmation MAC CE;
MAC CE for BSR, with exception of BSR included for padding and BSR for URLLC;
Single Entry PHR MAC CE or Multiple Entry PHR MAC CE;
data from any logical channel, except data from UL-CCCH and URLLC;
MAC CE for Recommended bit rate query;
MAC CE for BSR included for padding.

It should be noted that the above four possible first LCP orders are only intended to help those skilled in the art better understand the first LCP order, but not to limit the scope of the first LCP order.

Optionally, the first MAC PDU in an implementation of the present disclosure may include multiple MAC sub-PDUs, wherein the MAC sub-PDU may include a Serving Data Unit (SDU) and its sub-header, or may include a first MAC CE and its sub-header, wherein the first MAC CE may be an MAC CE with a fixed size, or an MAC CE with a variable length, as shown in FIG. 3, for example.

Optionally, the LCP restriction of the first PUSCH resource may represent a requirement or a restriction on the first PUSCH resource, when the first PUSCH resource is used to transmit information in a logical channel. If the first PUSCH resource satisfies the requirement or the restriction, data or information in the logical channel may be transmitted on the first PUSCH resource. For example, the LCP restriction may be: the first PUSCH resource with a duration of 5 slots may transmit data of logical channel 1, and the first PUSCH resource with a duration of 2 slots may transmit data of logical channel 2 and logical channel 3.

Whether the first logical channel satisfies the LCP restriction of the first PUSCH resource mentioned in the above content may be understood as: whether the LCP restriction of the first PUSCH resource (which may be, for example, the attribute of the first PUSCH resource) matches the first logical channel.

In an implementation of the present disclosure, when the first information satisfies at least one of following conditions, the terminal device may determine that the first SR is preferentially transmitted to the physical layer at the MAC layer, and/or indicate, at the MAC layer, the physical layer to preferentially transmit the first SR to the network device: (1) the first indication information indicates that the terminal device preferentially transmits the first SR; (2) when the second indication information is carried in a second MAC CE, a type of the second MAC CE is a first MAC CE type;

(3) the type of the first MAC CE is the first MAC CE type; (4) the priority of the first PUSCH resource is lower than or equal to a first preset priority threshold; (5) the priority of the first PUCCH resource is higher than or equal to the first preset priority threshold; (6) the priority of the first PUSCH resource is lower than or equal to the priority of the first PUCCH resource; (7) the identity of the first PUSCH resource is not a first resource identity; (8) the identity of the first PUSCH resource is a second resource identity; (9) the identity of the first PUCCH resource is the first resource identity; (10) the period of the first PUSCH resource is greater than or equal to a preset PUSCH period threshold; (11) the period of the first PUCCH resource is less than or equal to the preset PUCCH period threshold; (12) the period of the first PUSCH resource is greater than or equal to the period of the first PUCCH resource; (13) a transmission duration of the first PUSCH resource is greater than or equal to a preset PUSCH transmission duration; (14) a transmission duration of the first PUCCH resource is less than or equal to a preset PUCCH transmission duration; (15) the transmission duration of the first PUSCH resource is greater than or equal to the transmission duration of the first PUCCH resource; (16) the MCS level used for transmitting the first PUSCH resource is greater than or equal to a preset MCS level; (17) the MCS level used for transmitting the first PUCCH resource is less than or equal to the preset MCS level; (18) the MCS level used for transmitting the first PUSCH resource is greater than or equal to the MCS level used for transmitting the first PUCCH resource; (19) the attribute of the logical channel that the first PUSCH resource can carry does not satisfy a set attribute of a logical channel; (20) the service information that the first PUSCH resource can carry does not satisfy set service information; (21) the priority of the logical channel corresponding to the first MAC CE is lower than or equal to a second preset priority threshold; (22) the priority of the first logical channel is higher than or equal to the second preset priority threshold; (23) the priority of the logical channel corresponding to the first MAC CE is lower than or equal to a priority of the first logical channel; (24) the identity of the logical channel corresponding to the first MAC CE is not the first logical channel identity; (25) the identity of the logical channel corresponding to the first MAC CE is a second logical channel identity; (26) the identity of the first logical channel is the first logical channel identity; (27) a service type of a service carried by the logical channel corresponding to the first MAC CE is not a first service type; (28) the service type of the service carried by the logical channel corresponding to the first MAC CE is a second service type; (29) a service type of a service carried by the first logical channel is the first service type; (30) a priority of the service carried by the logical channel corresponding to the first MAC CE is lower than or equal to the priority of the service carried by the first logical channel; (31) the priority of the service carried by the logical channel corresponding to the first MAC CE is lower than or equal to a preset service priority; (32) the priority of the service carried by the first logical channel is higher than or equal to the preset service priority; (33) the reason for triggering the first MAC CE is a specific reason; (34) the priority of the first logical channel is higher than or equal to the priority of the logical channel corresponding to the first MAC CE, and data of the first logical channel cannot be carried in the first PUSCH resource; (35) the priority of the first logical channel is higher than or equal to the priority of the logical channel corresponding to the first MAC CE, and the first SR is triggered after the first MAC PDU is packaged; (36) the first SR is triggered before the first MAC PDU is packaged, and data of the first logical channel cannot be carried in the first PUSCH resource; (37) the first SR is triggered before the first MAC PDU is packaged, and the first logical channel does not satisfy the LCP restriction of the first PUSCH resource; (38) a reason for triggering Random Access (RA) is locating; (39) the reason for triggering RA is that in an RRC connected state, uplink data arrive and there is no available uplink resource, and a logical channel triggering the random access process is not a specific logical channel; (40) the reason for triggering RA is that in the RRC connected state, uplink data arrive and there is no available uplink resource, and the logical channel triggering the random access process is a second logical channel; (41) the reason for triggering RA is that in the RRC connected state, uplink data arrive and there is no available uplink resource, and the logical channel triggering RA is not a logical channel where the first service is located; (42) the reason for triggering RA is that in the RRC connected state, uplink data arrive and there is no available uplink resource, and the logical channel triggering RA is a logical channel where the second service is located; (43) the reason for triggering RA is that in the RRC connected state, uplink data arrive and there is no available uplink resource, and a priority of the logical channel triggering RA is lower than a third preset priority threshold; (44) the reason for triggering RA is that in the RRC connected state, uplink data arrive and there is no available uplink resource, and the priority of the logical channel triggering RA is lower than that of the first logical channel; (45) the reason for triggering RA is that the terminal device requests other system information; (46) the reason for triggering RA is that the terminal device adds TA in SCell; (47) the reason for triggering RA is a beam failure recovery.

Herein, a first type MAC CE may be, but is not limited to, any one of following: C-RNTI MAC CE; first type MAC SDU; configured grant confirmation MAC CE; MAC CE for BSR, with exception of BSR included for padding; single entry PHR MAC CE; multiple entry PHR MAC CE; BSR MAC CE triggered by a service except the first service, or BSR MAC CE triggered by a logical channel except the first logical channel.

It should be understood that in an implementation of the present disclosure, the first type MAC SDU may have a same function as the first type MAC CE.

The first type MAC CE may be predefined, or the first type MAC CE may be determined by the terminal device. In this way, overhead of an air interface signaling is avoided, which is more in line with a current service transmission requirement and specificity, and the terminal device may have more degrees of freedom. Of course, the first type MAC CE may also be configured or indicated by the network device. For example, the network device may send a second message to the terminal device, wherein the second message is used for configuring or indicating the first type MAC CE.

Optionally, the specific reason mentioned in the above may include at least one of following reasons: a reason for triggering the first MAC CE is random access; the first MAC CE is used for activating or deactivating a configured grant; the first MAC CE is triggered by a BSR; the first MAC CE is triggered by a BSR of the first service (such as an URLLC service); or the first MAC CE is not triggered by the BSR of the first service (such as the URLLC service).

Act 5: if the terminal device determines, at the MAC layer, to indicate the physical layer to preferentially transmit the first SR to the network device, and/or preferentially transmit the first SR to the physical layer, the terminal device may indicate, at the MAC layer, the physical layer to transmit the first SR, and/or preferentially transmit the first SR to the physical layer. Further, the terminal device may indicate the first MAC PDU to the physical layer at the MAC layer. Herein, the terminal device indicates the first MAC PDU to the physical layer, which may be understood as: the terminal device transmits the first MAC PDU to the physical layer, or the terminal device stores the first MAC PDU in an HARQ buffer.

Or, the terminal device may not generate the first MAC PDU or discard the first MAC PDU. Illustratively, the terminal device may determine to discard the first MAC PDU or not to generate the first MAC PDU, when the first PUSCH resource overlaps with the first PUCCH resource.

Of course, the terminal device may also indicate the first MAC PDU to the physical layer at the MAC layer, before determining whether to preferentially transmit the first SR. That is, when the terminal device determines to preferentially transmit the first SR, the terminal device has indicated the first MAC PDU to the physical layer at the MAC layer. Or, the terminal device may indicate the first MAC PDU to the physical layer at the MAC layer no matter in which case or regardless of any conditions.

Accordingly, at the MAC layer, the terminal device may package the first MAC PDU before determining to preferentially transmit the first SR, or the terminal device may package the first MAC PDU when or after determining to preferentially transmit the first SR.

Act 6: the terminal device determines, at the physical layer, whether to preferentially transmit the first SR to the network device.

It should be noted that even though the terminal device has indicated, at the MAC layer, the physical layer to preferentially transmit the first SR to the network device, the terminal device may not preferentially transmit the first SR to the network device at the physical layer according to the indication of the MAC layer, and the terminal device also needs to determine, at the physical layer, whether to preferentially transmit the first SR to the network device.

In a possible implementation, the terminal device may preferentially transmit the first SR to the network device at the physical layer in any case or regardless of any conditions.

In another possible implementation, the terminal device may determine, at the physical layer according to second information, whether to preferentially transmit the first SR to the network device.

Herein, the second information may be specified by a protocol, or configured by the network device to the terminal device.

Optionally, the second information may include, but is not limited to, at least one of following:

whether the terminal device receives the first SR and the first MAC PDU at the physical layer;

a time order by which the terminal device receives the first SR and the first MAC PDU at the physical layer;

the priority of the first logical channel;

the priority of the logical channel corresponding to the first MAC PDU;

the priority of the first PUCCH resource; or the priority of the first PUSCH resource.

When the second information satisfies at least one of following conditions, the terminal device may determine to preferentially transmit the first SR to the network device at the physical layer:

the terminal device receives the first MAC PDU and the first SR at the physical layer;

the terminal device receives the first SR when or after or before the physical layer receives the first MAC PDU;

the priority of the first logical channel is higher than or equal to the priority of the logical channel corresponding to the first MAC PDU; or the priority of the first PUCCH resource is higher than or equal to the priority of the first PUSCH resource.

Optionally, that the terminal device receives the first SR at the physical layer mentioned here may be understood as: the terminal device has transmit the first SR to the physical layer at the MAC layer, and/or the terminal device has indicated, at the MAC layer, sending of the first SR to the physical layer.

After the terminal device determines, at the physical layer, to preferentially transmit the first SR to the network device, the terminal device may preferentially transmit the first SR to the network device. As shown in FIG. 4, the first PUCCH resource and the first PUSCH resource are overlapped at reference number 2, and the terminal device has received the first SR and the first MAC PDU at the physical layer, then the terminal device may determine, at the physical layer, to preferentially transmit the first SR to the network device. Herein, the terminal device may preferentially transmit the first SR to the network device at reference numbers 1, 2, and 3, or the terminal device may preferentially transmit the first SR to the network device at reference number 2, or the terminal device may preferentially transmit the first SR to the network device at reference numbers 2 and 3.

According to the above technical solution, when a resource for transmitting an SR and a resource for transmitting an MAC PDU are overlapped, the terminal device determines whether to preferentially transmit the SR. In this way, the terminal device may preferentially transmit the SR in some scenarios, which may ensure that a network device knows that there is an IIOT service which needs to be transmitted in time to a certain extent, so that the network device may schedule the IIOT service in time, thus ensuring QoS of the IIOT service. Therefore, possibility of a normal transmission of the IIOT service is improved.

It should be noted that if the first MAC PDU has been packaged, or the terminal device has indicated the first MAC PDU to the physical layer at the MAC layer, or a transmission of the first MAC PDU has started, the terminal device may not indicate the first SR to the physical layer, or the terminal device may not transmit the first SR to the network device. Further, even though the priority of the first SR is not lower than that of the first MAC PDU, the terminal device may not indicate the first SR to the physical layer, or the terminal device may not transmit the first SR to the network device.

Optionally, in an implementation of the present disclosure, when the terminal device determines to preferentially transmit the first SR, if the first MAC PDU has been generated before the first SR is triggered, the terminal device may perform at least one of following acts: storing the first MAC PDU in the HARQ buffer; transmitting at least one of the first MAC PDU, a grant for the first MAC PDU, and HARQ information of the first MAC PDU to an HARQ process.

Further, the terminal device may also indicate priority information to the physical layer at the MAC layer when transmitting the first MAC PDU. Likewise, the terminal device may indicate priority information to the physical layer at the MAC layer when transmitting the first SR.

Optionally, the priority information indicated by the terminal device to the physical layer at the MAC layer may include, but is not limited to, at least one of following: priority information of the first logical channel, priority information of the logical channel corresponding to the first MAC PDU, priority information of the first MAC PDU, priority information of the first PUCCH resource, or priority information of the first PUSCH resource.

Further, the terminal device may also indicate attribute information of the logical channel to the physical layer at the MAC layer, e.g., service information of the first logical channel, identity information of the first logical channel, service information of the logical channel corresponding to the first MAC PDU, or identity information of the logical channel corresponding to the first MAC PDU, etc.

As for the network device, the network device may consider that there is a deprioritized first MAC PDU, and/or perform retransmission scheduling on an HARQ process corresponding to the first MAC PDU. At this time, the terminal device may transmit the first MAC PDU to the network device by using a retransmission resource.

Or, the network may consider that there is not a deprioritized first MAC PDU, and/or perform new transmission scheduling on the HARQ process corresponding to the first MAC PDU. At this time, the terminal device may transmit the first MAC PDU to the network device by using a new transmission resource.

If the first MAC PDU has not been packaged, the method 200 at this time may further include: the terminal device determines whether to package the first MAC PDU.

First Implementation

The terminal device packages the first MAC PDU. For example, in any case, the terminal device may package the first MAC PDU.

At this time, the terminal device may also perform at least one of following acts: storing the first MAC PDU in the HARQ buffer; determining the first MAC PDU to be a deprioritized MAC PDU; transmitting at least one of the first MAC PDU, a grant, or HARQ information of the first MAC PDU to an HARQ process; indicating the physical layer to transmit according to the grant, that is, the terminal device indicates, at the MAC layer, the physical layer to send the first MAC PDU to the network device according to the grant; or indicating priority information of the physical layer and/or attribute information of the logical channel.

As for the network device, when the network device determines that there is conflict between the first PUCCH resource and the first PUSCH resource, the network device may have two actions.

(1) The network device considers that there is a deprioritized first MAC PDU, and/or performs retransmission scheduling on the HARQ process corresponding to the first MAC PDU.

Figure 5:
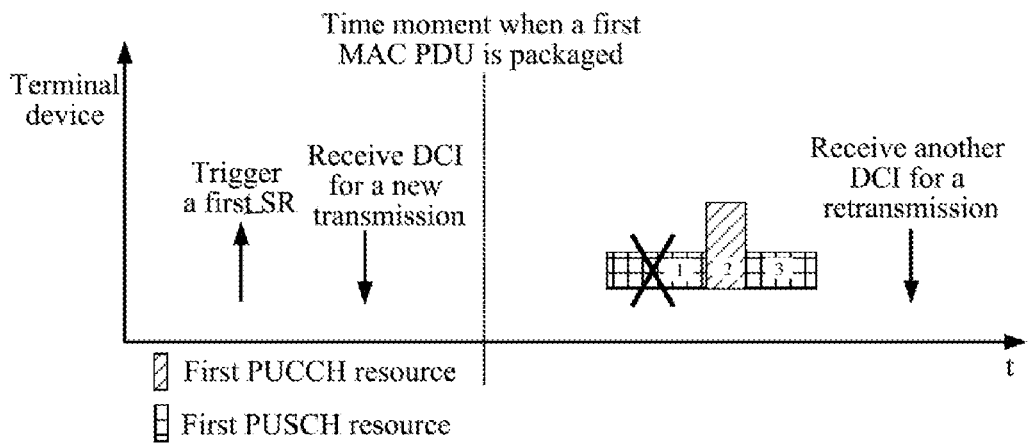
FIG. 5 is a schematic diagram of performing, by a network device, retransmission scheduling on a first MAC PDU according to an implementation of the present disclosure.

Accordingly, for the terminal device, the terminal device may transmit all or part of contents in the first MAC PDU to the network device by using a retransmission resource. As shown in FIG. 5, the terminal device receives another piece of DCI for a retransmission, then the terminal device may transmit all or part of the contents in the first MAC PDU to the network device on a retransmission resource indicated by the DCI.

Figure 6:
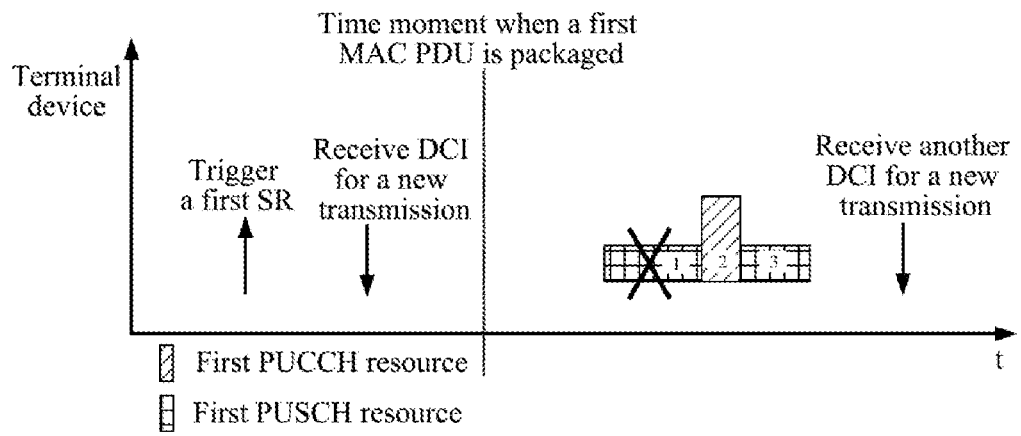
FIG. 6 is a schematic diagram of performing, by a network device, new transmission scheduling on a first MAC PDU according to an implementation of the present disclosure.

(2) The network device considers that there is not a deprioritized first MAC PDU, and/or performs new transmission scheduling on the HARQ process corresponding to the first MAC PDU. For example, it is as shown in FIG. 6.

At this time, the terminal device may transmit the first MAC PDU to the network device by using a new transmission resource.

According to the technical solution of the first implementation, different processing by the terminal device on different cases (for example, case 1: the first SR is triggered before the first MAC PDU is generated, and case 2: the first SR is triggered after the first MAC PDU is generated) may be avoided, avoiding complexity of implementation by the terminal device, inconsistent understanding for the first MAC PDU between the terminal device and the network device may also be avoided at the same time, and it may also be ensured that, when the network device performs retransmission scheduling on the first MAC PDU, the terminal device has a saved first MAC PDU.

Second Implementation

As an example, the terminal device does not package the first MAC PDU. For example, the terminal device does not package the first MAC PDU in any case.

As another example, if any one of following conditions is met, the terminal device may determine not to package the first MAC PDU: if the priority of the first logical channel is higher than or equal to the priority of the logical channel corresponding to the first MAC PDU, the terminal device determines not to package the first MAC PDU; or, if the priority of the first logical channel is higher than or equal to the priority of the first MAC PDU, the terminal device determines not to package the first MAC PDU; or, if the priority of the first PUCCH resource is higher than or equal to the priority of the first PUSCH resource, the terminal device determines not to package the first MAC PDU; or, if the priority of the first logical channel is higher than or equal to the priority of the logical channel corresponding to the first MAC PDU, and the first MAC PDU is not packaged, the terminal device determines not to package the first MAC PDU; or, if the priority of the first logical channel is higher than or equal to the priority of the first MAC PDU, and the first MAC PDU is not packaged, the terminal device determines not to package the first MAC PDU; or, if the priority of the first PUCCH resource is higher than or equal to the priority of the first PUSCH resource, and the first MAC PDU is not packaged, the terminal device determines not to package the first MAC PDU.

At this time, the terminal device may also perform at least one of following acts: determining that there is not a deprioritized first MAC PDU, or ignoring the grant for the first MAC PDU.

The terminal device ignores the grant, which may specifically include: when the network device determines that there is a deprioritized first MAC PDU, and/or performs retransmission scheduling on the HARQ process corresponding to the first MAC PDU, the terminal device may ignore a grant for retransmission scheduling.

Or, the terminal device ignores the grant for retransmission scheduling, which may specifically include at least one of following:

if the terminal device receives a grant on a Physical Downlink Control Channel (PDCCH) scrambled by a C-RNTI, and a buffer of an identified HARQ process is empty, the terminal device may ignore the grant (If the uplink grant received on PDCCH was addressed to C-RNTI and if the HARQ buffer of the identified process is empty due to PUCCH resource for the SR transmission occasion overlapping with UL-SCH resource);

if the terminal device receives the grant on the PDCCH scrambled by the C-RNTI, a New Data Indicator (NDI) is reversed, and the buffer of the identified HARQ process is empty, the terminal device may ignore the grant;

if a grant is received on a PDCCH scrambled by a Configured Scheduling cell-Radio Network Temporary Identity (CS-RNTI), and the buffer of the identified HARQ process is empty, the terminal device may ignore the grant (If the uplink grant received on PDCCH was addressed to CS-RNTI and if the HARQ buffer of the identified process is empty);

if the grant is a part of a bundle and no MAC PDU is obtained for the bundle (If the uplink grant is part of a bundle and if no MAC PDU has been obtained for this bundle);

if the grant is a part of a bundle of a configured grant, and the first PUSCH of the grant overlaps with a PUSCH of another grant received on a PDCCH or in a random access response of this serving cell (If the uplink grant is part of a bundle of the configured uplink grant, and the PUSCH of the uplink grant overlaps with a PUSCH of another uplink grant received on the PDCCH or in a Random Access Response for this Serving Cell).

For the network device, the network device may have two actions.

a. The network device considers that there is a deprioritized first MAC PDU, and/or performs retransmission scheduling on the HARQ process corresponding to the first MAC PDU.

In this case, the action of the terminal device has already been described by the above content, and will not be repeated here.

b. The network device considers that there is not a deprioritized first MAC PDU, and/or performs new transmission scheduling on the HARQ process corresponding to the first MAC PDU.

Accordingly, the terminal device may generate a second MAC PDU according to a new transmission resource, for example, the terminal device may generate the second MAC PDU according to a size of a Transport Block Size (TBS) of the new transmission resource, and transmit the generated second MAC PDU to the network device. Illustratively, referring to FIG. 6, the terminal device may transmit the second MAC PDU to the network device on at least one resource after reference numbers 1, 2, and 3.

According to the technical solution of the second implementation, a problem of retransmission waiting delay caused by that the first MAC PDU cannot be transmitted while packaging is performed is avoided, and a problem of the overlapping of the resources for the physical layer to perform acts is avoided, thereby simplifying implementation of terminal device.

Optionally, in an implementation of the present disclosure, the method 200 may further include: if the terminal device has indicated, at the MAC layer, the physical layer to transmit the first SR, or a transmission of the first SR has started, even though at this time the terminal device finds that the priority of the first SR is not lower than that of the first MAC PDU, the terminal device does not package the first MAC PDU either. Specifically, the terminal device may perform at least one of following acts: not packaging the first MAC PDU, considering that there is not a deprioritized first MAC PDU, or ignoring the grant for retransmission scheduling.

It should be understood that in an implementation of the present disclosure, the terms "first" and "second" are only for distinguishing between different objects, but do not constitute a limitation on the scope of an implementation of the present disclosure.

An implementation of the present disclosure further provides another communication method. In this communication method, if the first PUSCH resource and a second PUSCH resource for transmitting a third MAC PDU are overlapped, the terminal device determines whether to preferentially transmit the third MAC PDU.

In a possible implementation, the terminal device determines, at the physical layer, whether to preferentially transmit the third MAC PDU to the network device.

Optionally, the terminal device may determine, according to third information, whether to preferentially transmit the first SR to the network device at the physical layer.

Herein, the third information may be specified by a protocol, or configured by the network device to the terminal device.

Optionally, the third information may include, but is not limited to, at least one of following: whether the terminal device receives the first MAC PDU and the third MAC PDU at the physical layer; a time order in which the terminal device receives the first MAC PDU and the third MAC PDU at the physical layer; a priority of the logical channel corresponding to the first MAC PDU; a priority of the logical channel corresponding to the third MAC PDU; a priority of the first PUSCH resource; or a priority of the second PUSCH resource.

When the third information satisfies at least one of following conditions, the terminal device may determine, at the physical layer, to preferentially transmit the third MAC PDU to the network device, or the terminal device may consider that a priority of the third MAC PDU is higher than that of the first MAC PDU:

the terminal device receives the first MAC PDU and the third MAC PDU at the physical layer;

the terminal device receives the third MAC PDU when or after or before the physical layer receives the first MAC PDU;

the priority of the logical channel corresponding to the first MAC PDU is lower than the priority of the logical channel corresponding to the third MAC PDU;

the priority of the first PUSCH resource is lower than that of the second PUSCH resource.

It should be understood that when the first PUSCH resource and the second PUSCH resource are overlapped, an implementation that the terminal device determines whether to preferentially transmit the third MAC PDU may refer to the implementation of the method 200, and will not be described in details here for brevity of the content.

FIG. 7 is a schematic diagram of a communication method 300 according to an implementation of the present disclosure. The method shown in FIG. 7 may be performed by a terminal device. The terminal device may be, for example, the terminal device 120 shown in FIG. 1. As shown in FIG. 7, the method 300 may include at least part of following contents.

In 310, when a PUCCH resource for a terminal device to transmit a first SR and a PUSCH resource to transmit a first MAC PDU are overlapped, and the terminal device determines to preferentially transmit the first SR, if the first MAC PDU is not packaged, the terminal device determines whether to package the first MAC PDU.

Optionally, in an implementation of the present disclosure, the terminal device determines whether to package the first MAC PDU, including: the terminal device determines to package the first MAC PDU.

Optionally, in an implementation of the present disclosure, the method 300 further includes that the terminal device performs at least one of following acts: determining the first MAC PDU to be a deprioritized MAC PDU; storing, the first MAC PDU, into an HARQ buffer; indicating, at an MAC layer, a physical layer to transmit according to an uplink grant for the first MAC PDU; or transmitting the uplink grant to an HARQ process.

Optionally, in an implementation of the present disclosure, the method 300 further includes: when a network device performs retransmission scheduling on an HARQ process corresponding to the first MAC PDU, the terminal device transmits at least part of the first MAC PDU to the network device by using a retransmission resource.

Optionally, in an implementation of the present disclosure, the terminal device determines whether to package the first MAC PDU, including: the terminal device determines not to package the first MAC PDU.

Optionally, in an implementation of the present disclosure, the terminal device determines whether to package the first MAC PDU, including at least one of following: if a priority of a logical channel triggering the first SR is higher than or equal to a priority of a logical channel corresponding to the first MAC PDU, the terminal device determines not to package the first MAC PDU; if the priority of the logical channel triggering the first SR is higher than or equal to a priority of the first MAC PDU, the terminal device determines not to package the first MAC PDU; or if a priority of the PUCCH resource is higher than or equal to a priority of the PUSCH resource, the terminal device determines not to package the first MAC PDU.

Optionally, in an implementation of the present disclosure, the method 300 further includes: the terminal device performs at least one of following acts: determining that there is not a deprioritized first MAC PDU; or ignoring an uplink grant for the first MAC PDU. For example, retransmission scheduling of the HARQ process of the first MAC PDU or an uplink grant of retransmission scheduling is ignored; or, in accordance with a new transmission, packaging or transmitting is performed for retransmission scheduling of the HARQ process of the first MAC PDU.

Optionally, in an implementation of the present disclosure, the terminal device ignores the uplink grant for the first MAC PDU, including: when the network device performs retransmission on the HARQ process corresponding to the first MAC PDU, the terminal device ignores the uplink grant for retransmission scheduling.

Optionally, in an implementation of the present disclosure, the terminal device ignores the uplink grant for the first MAC PDU, including at least one of following: if the terminal device receives the uplink grant on a PDCCH scrambled by a C-RNTI, and a buffer of an identified HARQ process is empty, the terminal device ignores the uplink grant; if the terminal device receives the uplink grant on the PDCCH scrambled by the C-RNTI, a New Data Indicator (NDI) is reversed, and the buffer of the identified HARQ process is empty, the terminal device ignores the uplink grant; or if the terminal device receives the uplink grant on a PDCCH scrambled by a CS-RNTI, and the buffer of the identified HARQ process is empty, the terminal device ignores the uplink grant.

Optionally, in an implementation of the present disclosure, the method 300 further includes: when the network device performs new transmission scheduling on the HARQ process corresponding to the first MAC PDU, the terminal device generates a second MAC PDU according to a new transmission resource; and the terminal device transmits the second MAC PDU to the network device.

Optionally, in an implementation of the present disclosure, the method 300 further includes: the terminal device transmits the first MAC PDU to the physical layer at the MAC layer.

FIG. 8 is a schematic diagram of a communication method 400 according to an implementation of the present disclosure. The method shown in FIG. 8 may be performed by a network device. The network device may be, for example, the network device 110 shown in FIG. 1. As shown in FIG. 8, the method 400 may include at least part of following contents.

In 410, if a PUCCH resource for a terminal device to transmit a first SR and a PUSCH resource to transmit a first MAC PDU are overlapped, a network device preferentially receives the first SR.

Optionally, in an implementation of the present disclosure, the method 400 further includes: the network device determines that there is a deprioritized first MAC PDU, and/or the network device performs retransmission scheduling on an HARQ process corresponding to the first MAC PDU.

Optionally, in an implementation of the present disclosure, the method 400 further includes: the network device receives at least part of the first MAC PDU transmitted by the terminal device using a retransmission resource.

Optionally, in an implementation of the present disclosure, the method 400 further includes: the network device determines that there is not a deprioritized first MAC PDU, and/or the network device performs new transmission scheduling on the HARQ process corresponding to the first MAC PDU.

Optionally, in an implementation of the present disclosure, the method 400 further includes: the network device receives a second MAC PDU transmitted by the terminal device.

It should be understood that although the methods 200 to 400 are separately described above, it does not mean that the methods 200 to 400 are independent, instead, cross reference may be made between the descriptions of the two methods. For example, the related description in the method 200 may be applied to the methods 300 and 400. For brevity of the content, the methods 300 and 400 will not be described in details in the implementations of the present disclosure.

The preferred implementations of the present disclosure have been described in detail above with reference to the accompanying drawings. However, the present disclosure is not limited to specific details of the implementations described above, and various simple variations may be made to the technical solutions of the present disclosure within the technical conception scope of the present disclosure, and these simple variations are all within the protection scope of the present disclosure.

For example, various specific technical features described in the specific implementations described above may be combined in any suitable mode without conflict. In order to avoid unnecessary repetition, various possible combination modes will not be further explained in the present disclosure.

As another example, various different implementations of the present disclosure may be combined arbitrarily as long as they do not violate the idea of the present disclosure, and the combinations should be regarded as the contents disclosed in the present disclosure as well.

It should be understood that sequence numbers of the foregoing processes do not mean execution sequences in various method implementations of the present disclosure. The execution sequences of the processes should be determined according to functions and internal logics of the processes, and should not be construed as any limitation on the implementation processes of the implementations of the present disclosure.

The communication methods in accordance with the implementations of the present disclosure have been described in detail above, and communication devices in accordance with the implementations of the present disclosure will be described below with reference to FIGS. 9 to 12. The technical features described in the method implementations are applicable to following device implementations.

FIG. 9 shows a schematic block diagram of a terminal device 500 in accordance with an implementation of the present disclosure. As shown in FIG. 9, the terminal device 500 includes a processing unit 510.

The processing unit 510 is configured to, if a Physical Uplink Control Channel (PUCCH) resource for a terminal device to transmit a first Scheduling Request (SR) and a Physical Uplink Shared Channel (PUSCH) resource to transmit a first Media Access Control (MAC) Protocol Data Unit (PDU) are overlapped, determine whether to preferentially transmit the first SR to a network device.

Optionally, in an implementation of the present disclosure, the processing unit 510 is specifically configured to, if the first SR and the first MAC PDU are received by the terminal device at a physical layer, determine to preferentially transmit the first SR to the network device at the physical layer.

Optionally, in an implementation of the present disclosure, the processing unit 510 is specifically configured to, if the first SR is received by the terminal device when or after the first MAC PDU is received by the terminal device at the physical layer, determine to preferentially transmit the first SR to the network device at the physical layer.

Optionally, in an implementation of the present disclosure, the processing unit 510 is further configured to: when it is determined to preferentially transmit the first SR and the first MAC PDU is not packaged, determine whether to package the first MAC PDU.

Optionally, in an implementation of the present disclosure, the processing unit 510 is specifically configured to determine to package the first MAC PDU.

Optionally, in an implementation of the present disclosure, the processing unit 510 is further configured to perform at least one of following acts: determining the first MAC PDU to be a deprioritized MAC PDU; storing the first MAC PDU into a Hybrid Automatic Repeat Request (HARQ) buffer; indicating, at the MAC layer, the physical layer to transmit according to an uplink grant for the first MAC PDU; or transmitting the uplink grant to an HARQ process.

Optionally, in an implementation of the present disclosure, the terminal device 500 further includes: a communication unit 520, configured to transmit at least part of the first MAC PDU to the network device by using a retransmission resource, when the network device performs retransmission scheduling on an HARQ process corresponding to the first MAC PDU.

Optionally, in an implementation of the present disclosure, the processing unit 510 is specifically configured to determine not to package the first MAC PDU.

Optionally, in an implementation of the present disclosure, the processing unit 510 is specifically configured to perform one of following acts: determining not to package the first MAC PDU if a priority of a logical channel triggering the first SR is higher than or equal to a priority of a logical channel corresponding to the first MAC PDU; determining not to package the first MAC PDU if the priority of the logical channel triggering the first SR is higher than or equal to a priority of the first MAC PDU; or determining not to package the first MAC PDU if a priority of the PUCCH resource is higher than or equal to a priority of the PUSCH resource.

Optionally, in an implementation of the present disclosure, the processing unit 510 is further configured to perform at least one of following acts: determining that there is not a deprioritized first MAC PDU; or ignoring an uplink grant for the first MAC PDU.

Optionally, in an implementation of the present disclosure, the processing unit 510 is specifically configured to ignore an uplink grant for retransmission scheduling, when the network device performs retransmission scheduling on the HARQ process corresponding to the first MAC PDU.

Optionally, in an implementation of the present disclosure, the processing unit 510 is specifically configured to perform at least one of following acts: ignoring the uplink grant if the uplink grant is received by the terminal device on a Physical Downlink Control Channel (PDCCH) scrambled by a Cell-Radio Network Temporary Identity (C-RNTI), and a buffer of an identified HARQ process is empty; ignoring the uplink grant if the uplink grant is received by the terminal device on the PDCCH scrambled by the C-RNTI, a New Data Indicator (NDI) is reversed, and the buffer of the identified HARQ process is empty; or ignoring the uplink grant if the uplink grant is received by the terminal device on a PDCCH scrambled by a Configured Scheduling cell-Radio Network Temporary Identity (CS-RNTI), and the buffer of the identified HARQ process is empty.

Optionally, in an implementation of the present disclosure, the processing unit 510 is further configured to generate a second MAC PDU according to a new transmission resource, when the network device performs new transmission scheduling on the HARQ process corresponding to the first MAC PDU; and the terminal device 500 further includes: a communication unit 520, configured to transmit the second MAC PDU to the network device.

Optionally, in an implementation of the present disclosure, the terminal device 500 further includes: a communication unit 520, configured to transmit the first MAC PDU to the physical layer at the MAC layer.

Optionally, in an implementation of the present disclosure, the terminal device 500 further includes: a communication unit 520, configured to transmit the first MAC PDU to the physical layer at the MAC layer, when the terminal device determines to preferentially transmit the first SR, and the first SR is triggered before the first MAC PDU is packaged.

It should be understood that the terminal device 500 may correspond to the terminal device in the method 200, and it may realize corresponding operations of the terminal device in the method 200, which will not be repeated here for sake of brevity.

FIG. 10 shows a schematic block diagram of a terminal device 600 in accordance with an implementation of the present disclosure. As shown in FIG. 10, the terminal device 600 includes a processing unit 610.

The processing unit 610 is configured to, if a first Media Access Control (MAC) Protocol Data Unit (PDU) is not packaged, determine whether to package the first MAC PDU when a Physical Uplink Control Channel (PUCCH) resource for the terminal device to transmit a first Scheduling Request (SR) and a Physical Uplink Shared Channel (PUSCH) resource to transmit the first MAC PDU are overlapped and the terminal device determines to preferentially transmit the first SR.

Optionally, in an implementation of the present disclosure, the processing unit 610 is specifically configured to determine to package the first MAC PDU.

Optionally, in an implementation of the present disclosure, the processing unit 610 is specifically configured to perform at least one of following acts: determining the first MAC PDU to be a deprioritized MAC PDU; storing the first MAC PDU into a Hybrid Automatic Repeat Request (HARQ) buffer; indicating, at the MAC layer, the physical layer to transmit according to an uplink grant for the first MAC PDU; or transmitting the uplink grant to an HARQ process.

Optionally, in an implementation of the present disclosure, the terminal device 600 further includes: a communication unit 620, configured to transmit at least part of the first MAC PDU to a network device by using a new transmission resource when the network device performs new transmission scheduling on an HARQ process corresponding to the first MAC PDU.

Optionally, in an implementation of the present disclosure, the processing unit 610 is specifically configured to determine not to package the first MAC PDU.

Optionally, in an implementation of the present disclosure, the processing unit 610 is specifically configured to perform at least one of following acts: if a priority of a logical channel triggering the first SR is higher than or equal to a priority of a logical channel corresponding to the first MAC PDU, determining not to package the first MAC PDU; if the priority of the logical channel triggering the first SR is higher than or equal to a priority of the first MAC PDU, determining not to package the first MAC PDU; or if a priority of the PUCCH resource is higher than or equal to a priority of the PUSCH resource, determining not to package the first MAC PDU.

Optionally, in an implementation of the present disclosure, the processing unit 610 is specifically configured to perform at least one of following acts: determining that there is not a deprioritized first MAC PDU; or ignoring an uplink grant for the first MAC PDU.

Optionally, in an implementation of the present disclosure, the processing unit 610 is specifically configured to ignore an uplink grant for retransmission scheduling when the network device performs retransmission on the HARQ process corresponding to the first MAC PDU.

Optionally, in an implementation of the present disclosure, the processing unit 610 is specifically configured to perform at least one of following acts: if the uplink grant is received by the terminal device on a Physical Downlink Control Channel (PDCCH) scrambled by a Cell-Radio Network Temporary Identity (C-RNTI), and a buffer of an identified HARQ process is empty, ignore the uplink grant; if the uplink grant is received by the terminal device on the PDCCH scrambled by the C-RNTI, a New Data Indicator (NDI) is reversed, and the buffer of the identified HARQ process is empty, ignore the uplink grant; or if the uplink grant is received by the terminal device on a PDCCH scrambled by a Configured Scheduling cell-Radio Network Temporary Identity (CS-RNTI), and the buffer of the identified HARQ process is empty, ignore the uplink grant.

Optionally, in an implementation of the present disclosure, the processing unit 610 is further configured to generate a second MAC PDU according to a new transmission resource, when the network device performs new transmission scheduling on the HARQ process corresponding to the first MAC PDU; and the terminal device 600 further includes: a communication unit 620, configured to transmit the second MAC PDU to the network device.

Optionally, in an implementation of the present disclosure, the terminal device 600 further includes: a communication unit 620, configured to transmit the first MAC PDU to the physical layer at the MAC layer.

It should be understood that the terminal device 600 may correspond to the terminal device in the method 300, and may implement corresponding operations of the terminal device in the method 300, which will not be repeated herein for brevity.

FIG. 11 shows a schematic block diagram of a network device 700 of an implementation of the present disclosure. As shown in FIG. 11, the network device 700 includes a communication unit 710.

The communication unit 710 is configured to, if a Physical Uplink Control Channel (PUCCH) resource for a terminal device to transmit a first Scheduling Request (SR) and a Physical Uplink Shared Channel (PUSCH) resource to transmit a first Media Access Control (MAC) Protocol Data Unit (PDU) are overlapped, preferentially receive the first SR transmitted by the terminal device.

Optionally, in an implementation of the present disclosure, the network device 700 further includes: a processing unit 720, configured to determine that there is a deprioritized first MAC PDU, and/or the communication unit 710 is further configured to perform retransmission scheduling on a Hybrid Automatic Repeat Request (HARQ) process corresponding to the first MAC PDU.

Optionally, in an implementation of the present disclosure, the communication unit 710 is further configured to receive at least part of the first MAC PDU transmitted by the terminal device using a retransmission resource.

Optionally, in an implementation of the present disclosure, the network device 700 further includes a processing unit 720, configured to determine that there is not a deprioritized first MAC PDU, and/or the communication unit 710 is further configured to perform new transmission scheduling on an HARQ process corresponding to the first MAC PDU.

Optionally, in an implementation of the present disclosure, the communication unit 710 is further configured to receive a second MAC PDU transmitted by the terminal device.

It should be understood that the network device 700 may correspond to the network device in the method 400, and may implement corresponding operations implemented by the network device in the method 400, which will not be repeated herein for brevity.

Figure 12:
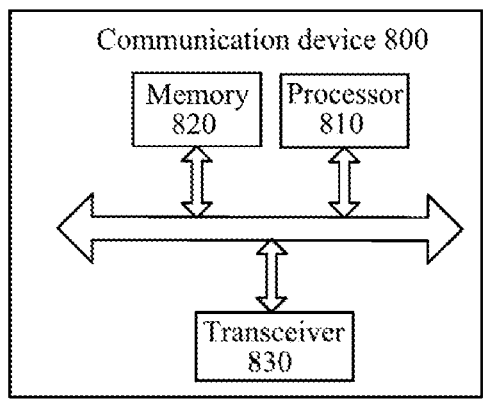
FIG. 12 is a schematic block diagram of a communication device in accordance with an implementation of the present disclosure.

FIG. 12 is a schematic structural diagram of a communication device 800 according to an implementation of the present disclosure. The communication device 800 shown in FIG. 12 includes a processor 810. The processor 810 may call and run a computer program from a memory to implement the method in an implementation of the present disclosure.

Optionally, as shown in FIG. 12, the communication device 800 may further include a memory 820. The processor 810 may call and run the computer program from the memory 820 to implement the method in an implementation of the present disclosure.

The memory 820 may be a separate device independent of the processor 810 or may be integrated in the processor 810.

Optionally, as shown in FIG. 12, the communication device 800 may further include a transceiver 830, and the processor 810 may control the transceiver 830 to communicate with other devices. Specifically, the transceiver 830 may send information or data to other devices or receive information or data sent by other devices.

The transceiver 830 may include a transmitter and a receiver. The transceiver 830 may further include antennas, the number of antennas may be one or more.

Optionally, the communication device 800 may specifically be a network device of an implementation of the present disclosure, and the communication device 800 may implement the corresponding processes implemented by the network device in various methods of the implementations of the present disclosure, which will not be repeated herein for brevity.

Optionally, the communication device 800 may specifically be a terminal device of the implementations of the present disclosure, and the communication device 800 may implement the corresponding processes implemented by the terminal device in various methods of the implementations of the present disclosure, which will not be repeated herein for brevity.

Figure 13:
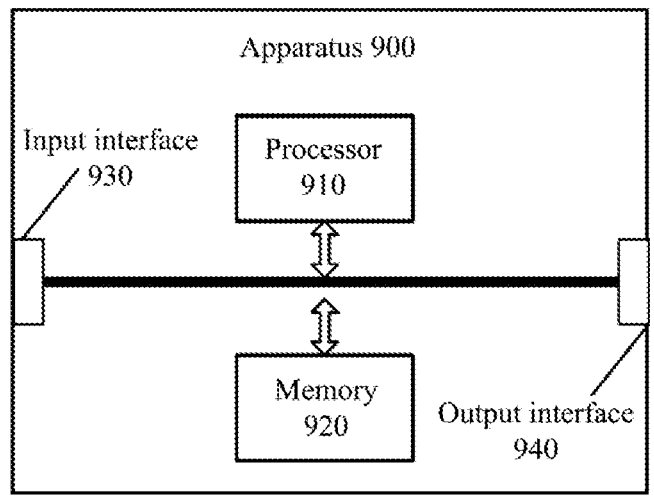
FIG. 13 is a schematic block diagram of an apparatus in accordance with an implementation of the present disclosure.

FIG. 13 is a schematic diagram of a structure of an apparatus in accordance with an implementation of the present disclosure. The apparatus 900 shown in FIG. 13 includes a processor 910. The processor 910 may call and run a computer program from a memory to implement the methods in the implementations of the present disclosure.

Optionally, as shown in FIG. 13, the apparatus 900 may further include a memory 920. Herein, the processor 910 may call from the memory 920 and run the computer program to implement the method in the implementations of the present disclosure.

The memory 920 may be a separate device independent of the processor 910 or may be integrated in the processor 910.

Optionally, the apparatus 900 may further include an input interface 930. The processor 910 may control the input interface 930 to communicate with other devices or chips. Specifically, the processor 710 may acquire information or data sent by other devices or chips.

Optionally, the apparatus 900 may further include an output interface 940. The processor 910 may control the output interface 940 to communicate with other devices or chips. Specifically, the processor 710 may output information or data to other devices or chips.

Optionally, the apparatus may be applied to the terminal device in the implementations of the present disclosure, and the apparatus may implement the corresponding processes implemented by the terminal device in various methods in accordance with the implementations of the present disclosure, which will not be repeated herein for brevity.

Optionally, the apparatus may be applied to the network device in the implementations of the present disclosure, and the apparatus may implement the corresponding processes implemented by the network device in various methods in accordance with the implementations of the present disclosure, which will not be repeated herein for brevity.

Optionally, the apparatus 900 may be a chip. It should be understood that the chip mentioned in an implementation of the present disclosure may be referred to as a system-level chip, a system chip, a chip system or a system-on-chip, etc.

It should be understood that the processor in this implementations of the present disclosure may be an integrated circuit chip having a signal processing capability. In an implementation process, various acts of the foregoing method implementations may be completed through an integrated logic circuit of hardware in the processor or instructions in a form of software. The processor above may be a general purpose processor, a Digital Signal Processor (DSP), an Application Specific Integrated Circuit (ASIC), a Field Programmable Gate Array (FPGA) or other programmable logic device, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor or the like. The acts of the methods disclosed with reference to the implementations of the present disclosure may be directly implemented to be completed by a hardware decoding processor, or may be implemented by a combination of the hardware in the decoding processor and software modules. The software modules may be located in a storage medium commonly used in the art, such as a random access memory, a flash memory, a read-only memory, a programmable read-only memory, an electrically erasable programmable memory, or a register, etc. The storage medium is located in the memory, and the processor reads the information in the memory and completes the acts of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through illustrative but non-restrictive description, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memories in the systems and methods described in this specification are intended to include, but are not limited to, these and any other suitable types of memories.

It should be understood that, the foregoing memory is described in an example for illustration and should not be construed as limiting. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, memories in the implementations of the present disclosure are intended to include, but are not limited to, these and any other suitable types of memories.

Figure 14:
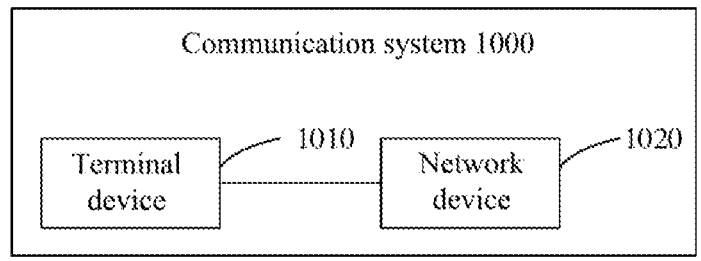
FIG. 14 is a schematic block diagram of a communication system in accordance with an implementation of the present disclosure.

FIG. 14 is a schematic block diagram of a communication system 1000 according to an implementation of the present disclosure. As shown in FIG. 14, the communication system 1000 may include a terminal device 1010 and a network device 1020.

Herein, the terminal device 1010 may be configured to implement corresponding functions implemented by the terminal device in the above-mentioned methods, and the network device 1020 may be configured to implement corresponding functions implemented by the network device in the above-mentioned methods, which will not be repeated here for brevity.

An implementation of the present disclosure further provides a computer-readable storage medium configured to store a computer program.

Optionally, the computer-readable storage medium may be applied in the terminal device in the implementations of the present disclosure, and the computer program enables a computer to perform the corresponding processes implemented by the terminal device in various methods of the implementations of the present disclosure, which will not be repeated herein for brevity.

Optionally, the computer-readable storage medium may be applied in the network device in the implementations of the present disclosure, and the computer program enables a computer to perform the corresponding processes implemented by the network device in various methods of the implementations of the present disclosure, which will not be repeated herein for brevity.

An implementation of the present disclosure further provides a computer program product including computer program instructions.

Optionally, the computer program product may be applied in a terminal device in the implementations of the present disclosure, and the computer program instructions cause a computer to perform the corresponding processes implemented by the terminal device in various methods of the implementations of the present disclosure, which will not be repeated herein for brevity.

Optionally, the computer program product may be applied in the network device in the implementations of the present disclosure, and the computer program instructions enable a computer to perform the corresponding processes implemented by the network device in various methods of the implementations of the present disclosure, which will not be repeated herein for brevity.

An implementation of the present disclosure further provides a computer program.

Optionally, the computer program may be applied in a terminal device in the implementations of the present disclosure, and the computer program, when running on a computer, causes the computer to perform the corresponding processes implemented by the terminal device in various methods of the implementations of the present disclosure, which will not be repeated herein for brevity.

Optionally, the computer program may be applied in a network device in the implementations of the present disclosure, and when the computer program is run on a computer, the computer is enabled to perform the corresponding processes implemented by the network device in various methods of the implementations of the present disclosure, which will not be repeated herein for brevity.

Those of ordinary skill in the art will recognize that the illustrative elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the forgoing method implementations and will not be repeated herein.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be an indirect coupling or communication connection between devices or units through some interfaces, or may be in electrical, mechanical or other forms.

The unit described as a separate component may or may not be physically separated, and the component shown as a unit may or may not be a physical unit, i.e., it may be located in one place or may be distributed across multiple network units. Some or all of the units may be selected according to actual needs to achieve the purpose of the implementations.

In addition, various functional units in various implementations of the present disclosure may be integrated into one processing unit, or the various units may be physically present separately, or two or more than two units may be integrated into one unit.

The functions may be stored in a computer-readable storage medium if achieved in a form of software functional unit and sold or used as an independent product. Based on such understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device, etc.) to perform all or part of the acts of the method described in various implementations of the present disclosure. The foregoing storage medium includes: any medium that may store program code, such as a USB flash disk, a mobile hard disk, a read-only memory (ROM), a random access memory (RAM), a magnetic disk, or an optical disk.

What are described above are merely specific implementations of the present disclosure, but the protection scope of the present disclosure is not limited thereto. Any variation or substitution that may easily conceived by a person familiar with the art within the technical scope disclosed by the present disclosure shall be included within the protection scope of the present disclosure. Therefore, the protection scope of the present disclosure shall be subject to the protection scope of the claims.

What is claimed is:

1. A communication method, comprising:

determining, by a terminal device, whether to preferentially transmit a first Scheduling Request (SR) to a network device when a Uplink Shared Channel (UL-SCH) resource for the terminal device to transmit the first SR and a Physical Uplink Shared Channel (PUSCH) resource to transmit a first Media Access Control (MAC) Protocol Data Unit (PDU) are overlapped; and determining, by the terminal device, not to package the first MAC PDU when the terminal device determines to preferentially transmit the first SR and the first MAC PDU is not packaged, wherein determining, by the terminal device, not to package the first MAC PDU comprises:

determining, by the terminal device, not to package the first MAC PDU if a priority of a logical channel triggering the first SR is higher than or equal to a priority of a logical channel corresponding to the first MAC PDU.

2. The method of claim 1, further comprising:

generating, by the terminal device, a second MAC PDU according to a new transmission resource when the network device performs new transmission scheduling on an HARQ process corresponding to the first MAC PDU; and transmitting, by the terminal device, the second MAC PDU to the network device.

3. A terminal device, comprising: a processor and a transceiver, wherein the processor is configured to determine whether to preferentially transmit a first Scheduling Request (SR) to a network device when an Uplink Shared Channel (UL-SCH) resource for the terminal device to transmit the first SR and a Physical Uplink Shared Channel (PUSCH) resource to transmit a first Media Access Control (MAC) Protocol Data Unit (PDU) are overlapped; and determine not to package the first MAC PDU when it is determined to preferentially transmit the first SR and the first MAC PDU is not packaged, and if a priority of a logical channel triggering the first SR is higher than or equal to a priority of a logical channel corresponding to the first MAC PDU.

4. The terminal device of claim 3, wherein the processor is further configured to:

generate a second MAC PDU according to a new transmission resource, when the network device performs new transmission scheduling on an HARQ process corresponding to the first MAC PDU;

the transceiver is configured to transmit the second MAC PDU to the network device.

* * * * *